United States Patent
Bobrovskiy et al.

(10) Patent No.: US 7,558,806 B2
(45) Date of Patent: Jul. 7, 2009

(54) METHOD AND APPARATUS FOR BUFFERING STREAMING MEDIA

(75) Inventors: Stanislav M. Bobrovskiy, Lake Forest Park, WA (US); Jeffrey M. Chasen, Redmond, WA (US)

(73) Assignee: RealNetworks, Inc., Seattle, WA (US)

( * ) Notice: Subject to any disclaimer, the term of this patent is extended or adjusted under 35 U.S.C. 154(b) by 906 days.

(21) Appl. No.: 10/736,452

(22) Filed: Dec. 14, 2003

(65) Prior Publication Data

US 2005/0132417 A1 Jun. 16, 2005

(51) Int. Cl.
  G06F 17/30 (2006.01)
  G06F 7/00 (2006.01)
  G06F 12/00 (2006.01)
  G06F 15/16 (2006.01)
  H04N 7/16 (2006.01)

(52) U.S. Cl. ............. 707/104.1; 725/89; 711/154; 709/231

(58) Field of Classification Search ............. 707/104.1; 725/89; 711/154; 709/231
  See application file for complete search history.

(56) References Cited

U.S. PATENT DOCUMENTS

| | | | |
|---|---|---|---|
| 5,933,385 A * | 8/1999 | Jiang et al. ............. | 365/230.01 |
| 5,933,835 A | 8/1999 | Adams et al. | |
| 6,151,634 A | 11/2000 | Glasser et al. | |
| 6,205,525 B1 * | 3/2001 | Korst ................. | 711/154 |
| 6,449,653 B2 * | 9/2002 | Klemets et al. ......... | 709/231 |
| 2002/0147739 A1 * | 10/2002 | Clements et al. ......... | 707/500 |
| 2002/0165912 A1 * | 11/2002 | Wenocur et al. ......... | 709/203 |
| 2003/0110504 A1 * | 6/2003 | Plourde et al. ......... | 725/89 |
| 2004/0193648 A1 * | 9/2004 | Lai et al. ............. | 707/104.1 |

OTHER PUBLICATIONS

"Robust Rate Control for Integrated Services Packet Networks," Blanchini, Franco et al., IEEE, Oct. 2002.

* cited by examiner

*Primary Examiner*—Kuen S Lu
(74) *Attorney, Agent, or Firm*—Adam L. K. Philipp; Axios Law Group, Pllc.

(57) ABSTRACT

A method and apparatus for buffering streamed presentation data within a container file includes receiving one or more data streams from each of one or more presentation sources within the presentation, creating within the container file a virtual file for each of the one or more presentation sources, temporarily storing first data associated with a first data stream of a first presentation source in association with a first virtual file corresponding to the presentation source, determining a container file size, and temporarily storing additional data from the first data stream in place of at least a portion of the first data if the container file size is within a predetermined range of an identified maximum buffer size.

24 Claims, 7 Drawing Sheets ate as a digital media playback engine designed to operate in coordination
METHOD AND APPARATUS FOR BUFFERING STREAMING MEDIA

BACKGROUND OF THE INVENTION

As the ability and speed with which consumers may access and/or obtain electronically distributed digital content grows, so too does consumer demand for such content. In response, device manufacturers and content providers have attempted to continually improve existing digital content rendering products that typically execute on what are referred to as playback devices. These playback devices may be portable in nature (as represented by a wireless mobile phone) or they may be fixed in nature (as represented by a desktop computer).

Consumers may obtain or otherwise access digital content in a number of ways including downloading and streaming digital content to a playback device. Downloading generally refers to the act of copying a file from one location or source to another where execution or rendering of the file data only begins after the entire file has been received. Streaming on the other hand generally refers to the transmission of data from one device or location to another where the data can start to be displayed, rendered, or otherwise executed before the entire data file has been transmitted.

Due to the amount of time it often takes to download large multimedia data files such as digital audio and/or video tracks, content providers typically opt to stream digital content to consumers. In order for streaming to work well, the client device receiving the data should be able to collect the data and send it as a steady stream to the appropriate processing logic equipped to convert the data to sound and/or pictures. For example, if the data doesn't come quickly enough, however, the presentation of the data might appear jittery and disjointed. Conversely, if the streaming client receives the data more quickly than required, it should save the excess data in a buffer.

Unfortunately however, as digital content becomes more complex the more difficult it is to buffer such streamed data without a degradation in sound/image quality. For example, a given digital content item (also referred to as a presentation) may contain multiple concurrent streams of time sensitive data arriving from one or more sources. Accordingly, an improved method and apparatus for recording and playback of such buffered presentations is desirable.

BRIEF DESCRIPTION OF DRAWINGS

The present invention will be described by way of exemplary embodiments, but not limitations, illustrated in the accompanying drawings in which like references denote similar elements, and in which.

DETAILED DESCRIPTION OF EMBODIMENTS OF THE INVENTION

In the description to follow, various aspects of the present invention will be described, and specific configurations will be set forth. However, the present invention may be practiced with only some or all aspects, and/or without some of these specific details. In other instances, well-known features are omitted or simplified in order not to obscure the present invention.

The description will be presented in terms of operations performed by a processor based device consistent with the manner commonly employed by those skilled in the art to convey the substance of their work to others skilled in the art. As is well understood by those skilled in the art, the quantities take the form of electrical, magnetic, or optical signals capable of being stored, transferred, combined, and otherwise manipulated through mechanical, electrical and/or optical components of the processor based device.

Various operations will be described as multiple discrete steps in turn, in a manner that is most helpful in understanding the present invention, however, the order of description should not be construed as to imply that these operations are necessarily order dependent. In particular, these operations need not be performed in the order of presentation.

The description repeatedly uses the phrase "in one embodiment", which ordinarily does not refer to the same embodiment, although it may. The terms "comprising", "including", "having", and the like, as used in the present application, are synonymous.

Figure 1:
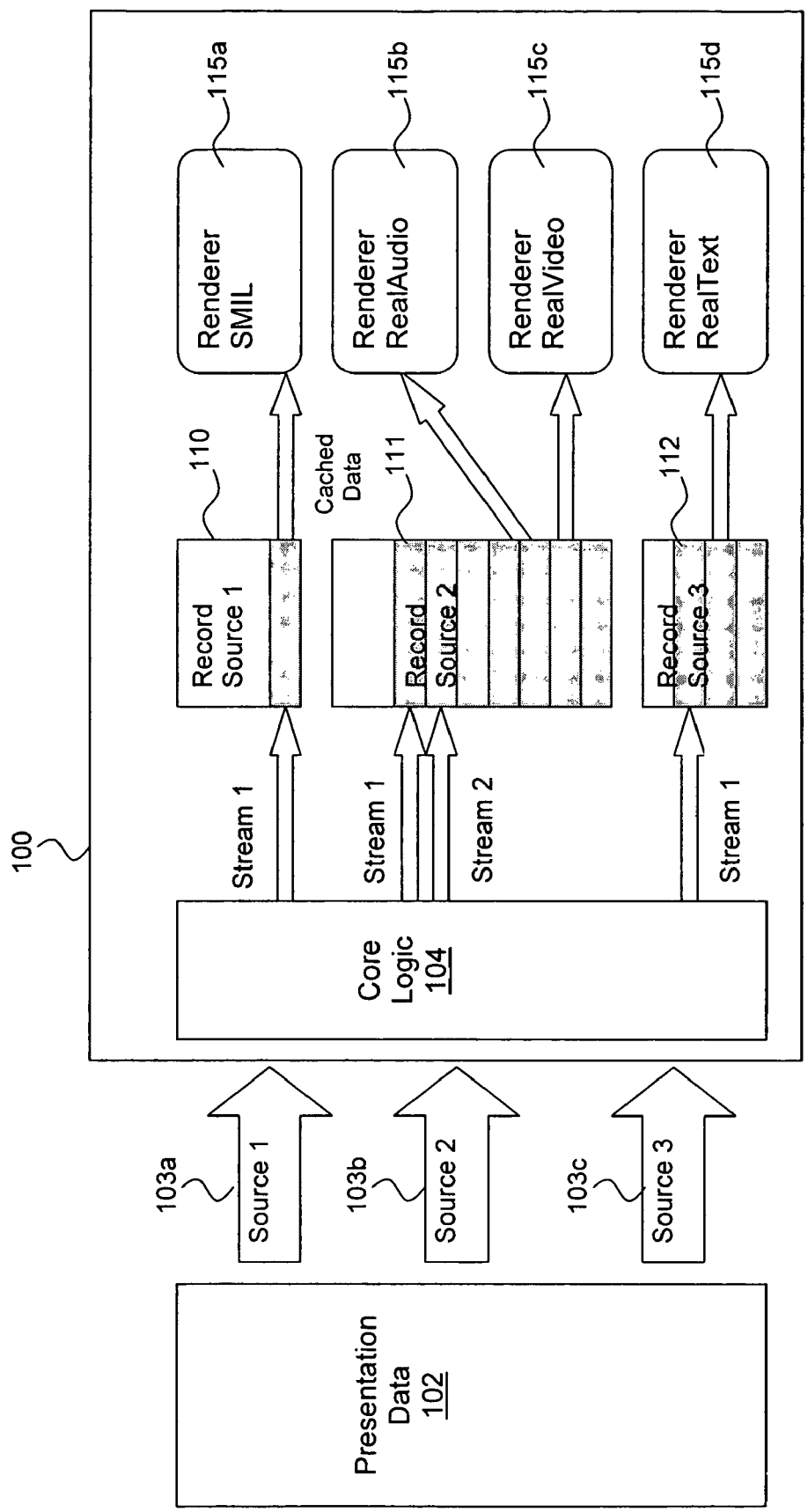
FIG. 1 illustrates an overview of the present invention in accordance with one embodiment.

FIG. 1 illustrates an overview of the present invention in accordance with one embodiment. As shown, digital presentation data 102, containing data associated with one or more of presentation sources 103(*a-c*), is received by client 100 and processed by core logic 104 to facilitate real-time playback/rendering of the data. Core logic 104 represents a digital media playback engine designed to operate in coordination with content render logic 115(*a-d*) to reproduce digital content (whether streamed or downloaded) on a playback device such as client 100.

In one embodiment, client device 100 may be equipped with buffering logic to provide improved content buffering capabilities including real-time playback and dynamic content seeking functions. In one embodiment, one or more record sources 110-112 may be instantiated to receive and temporarily store data from core logic 104 before passing the data to one or more decoders/renderers 115(*a-c*).

In one embodiment, core logic 104 may initialize one record source 110-112 for each presentation source 103(*a-c*) received e.g. in presentation data 102. Instead of immediately passing source data to decode/render logic 115(*a-c*) as it is received, core logic 104 may pass the data to corresponding record sources 110-112 based upon the presentation source of the data. For example, in FIG. 1, record source 1 (110) may receive data corresponding to presentation source 1 (103*a*), record source 2 (111) may receive data corresponding to presentation source 2 (103*b*), and record source 3 (112) may receive data corresponding to presentation source 3 (103c). In one embodiment, record sources 110-112 may temporarily store (e.g. buffer) the received data into presentation source-specific virtual files existing within a shared container file. In one embodiment, each source-specific virtual file may store data associated with one or more streams of a particular presentation source. For example, record source 1 (110) may store data associated with stream 1 of presentation source 1 (103a) within a first virtual file, whereas record source (111) may store data associated with stream 1 and stream 2 of presentation source 2 (103b) within a second virtual file. Thereafter, core logic 104 may pass data temporarily stored in the virtual files to the appropriate render logic 115(a-c) for processing.

In one embodiment a maximum buffer size that may be stored within the container file may be specified. The buffer size may be specified in terms of an amount of content (e.g., 24 MB) or an amount of time (e.g., 30 Minutes). In one embodiment, a user may specify the maximum buffer size that may be stored within the container file via a graphical user interface. In one embodiment, if the amount of data stored within the container file falls within a predetermined range of a specified maximum buffer size, additionally received data may be stored in place of data previously stored in the container. For example, if the container file reaches a specified size, core logic 104 may loop within the container file such that additional received data of a first presentation source (e.g. within a first virtual file) may be stored in place of previously stored data associated with the same presentation source as the (e.g. within the first virtual file).

Figure 2:
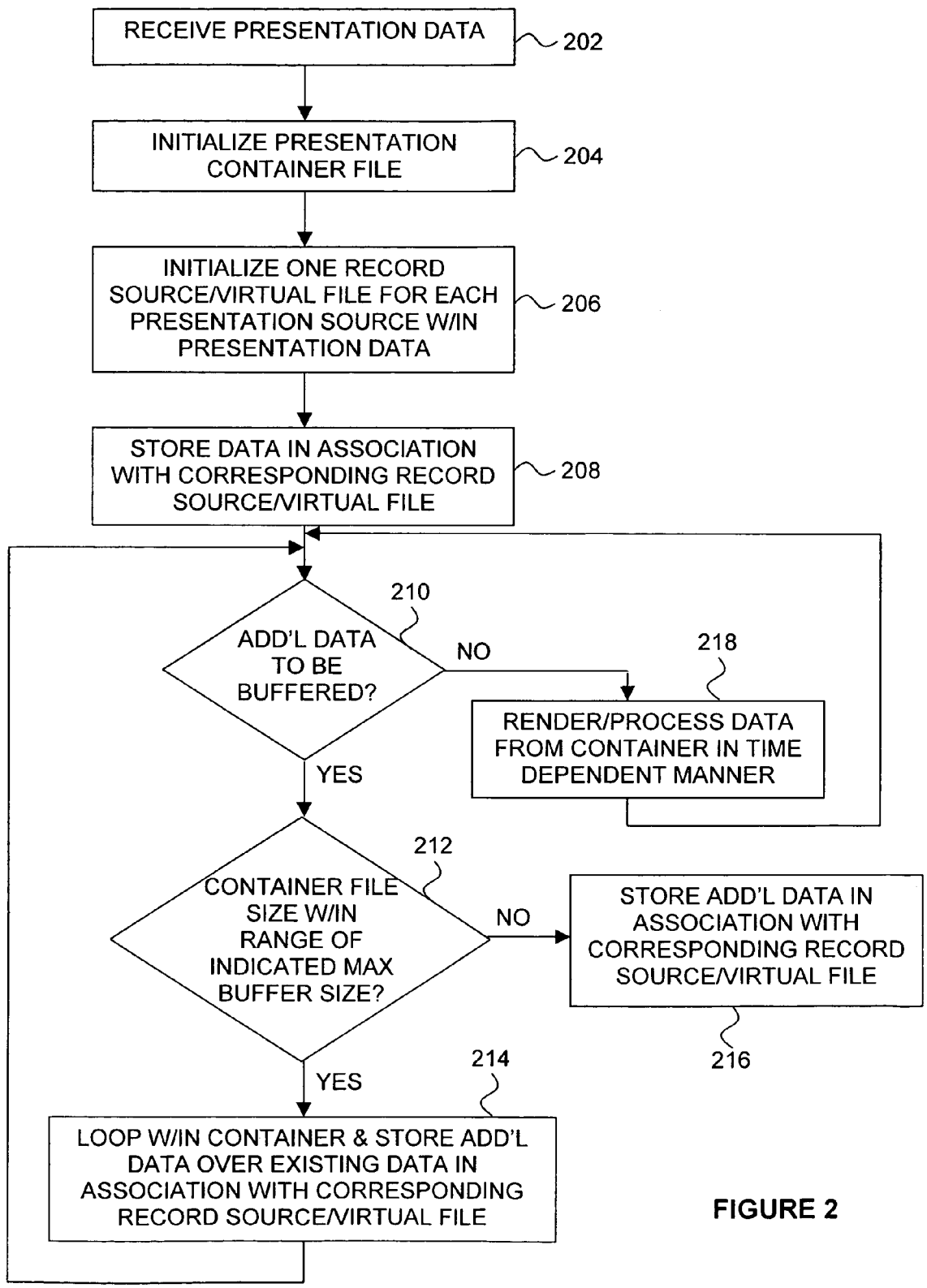
FIG. 2 illustrates an operational flow diagram for storing data into a container file in accordance with one embodiment of the invention.

FIG. 2 illustrates an operational flow diagram for storing data into a container file in accordance with one embodiment of the invention. As shown in the illustrated embodiment, the process begins at block 202 with presentation data being received by core logic 104. In one embodiment, the data is received in the form of time-interleaved packets corresponding to one or more presentation sources. The presentation data may represent a number of data types including, but not limited to text, audio, video and image data. Moreover, the data may represent metadata files such as '.RAM' files and synchronized multimedia integration language (SMIL) files used to specify a particular presentation structure which may include such text, audio, video and image data.

Upon receiving at least a portion of the presentation data, core logic 104 initializes the presentation container file (hereinafter 'container file') at block 204, and initializes one record source for each presentation source associated with the presentation data at block 206. In one embodiment, each record source is associated with a unique virtual file defined within the container file. As will be described in further detail below, in order to facilitate data playback, the container file may include a descriptor index to indicate the location of each virtual file within the container file. Moreover, each virtual file may contain a seek index to indicate the location of each corresponding data block within the corresponding virtual file. At block 208, the received presentation data is temporarily stored/buffered in association with a record source/virtual file corresponding to the originating presentation source.

At block 210, a determination is made as to whether additional data exists to be buffered. If not, data stored within the container may be rendered in a time-dependent manner at block 218. However, if additional data to be buffered exists at block 210, a further determination may be made as to whether the container file size is within a predetermined range of an indicated maximum buffer size at block 212. In one embodiment, a determination is made as to whether the container file size is greater than or equal to the indicated maximum buffer size. If the container file size is not within a predetermined range of an indicated maximum buffer size, additional data may be stored in association with the corresponding record source/virtual file at block 216. In one embodiment, if the current presentation source is the same as the presentation source associated with the last stored data block, the additional data may be appended to the last stored data block. However, if at block 212, the container file size is determined to be within a predetermined range of an indicated maximum buffer size, the additional data may be stored in place of at least a portion of existing data previously stored in association with a corresponding record source/virtual file at block 214. Thereafter, further determinations may be made as to whether additional data exist to be buffered.

It should be noted that although FIG. 2 appears to illustrate that data is rendered only if no additional data remains to be buffered at block 210, this need not be the case. For example, data stored within the container file in association with one or more streams may be rendered from the container file in real-time while new data continues to be stored within the container. Similarly, although initialization of the container file and record source(s) is illustrated as being two separate operations such operations may nonetheless be combined or further separated.

Figure 3:
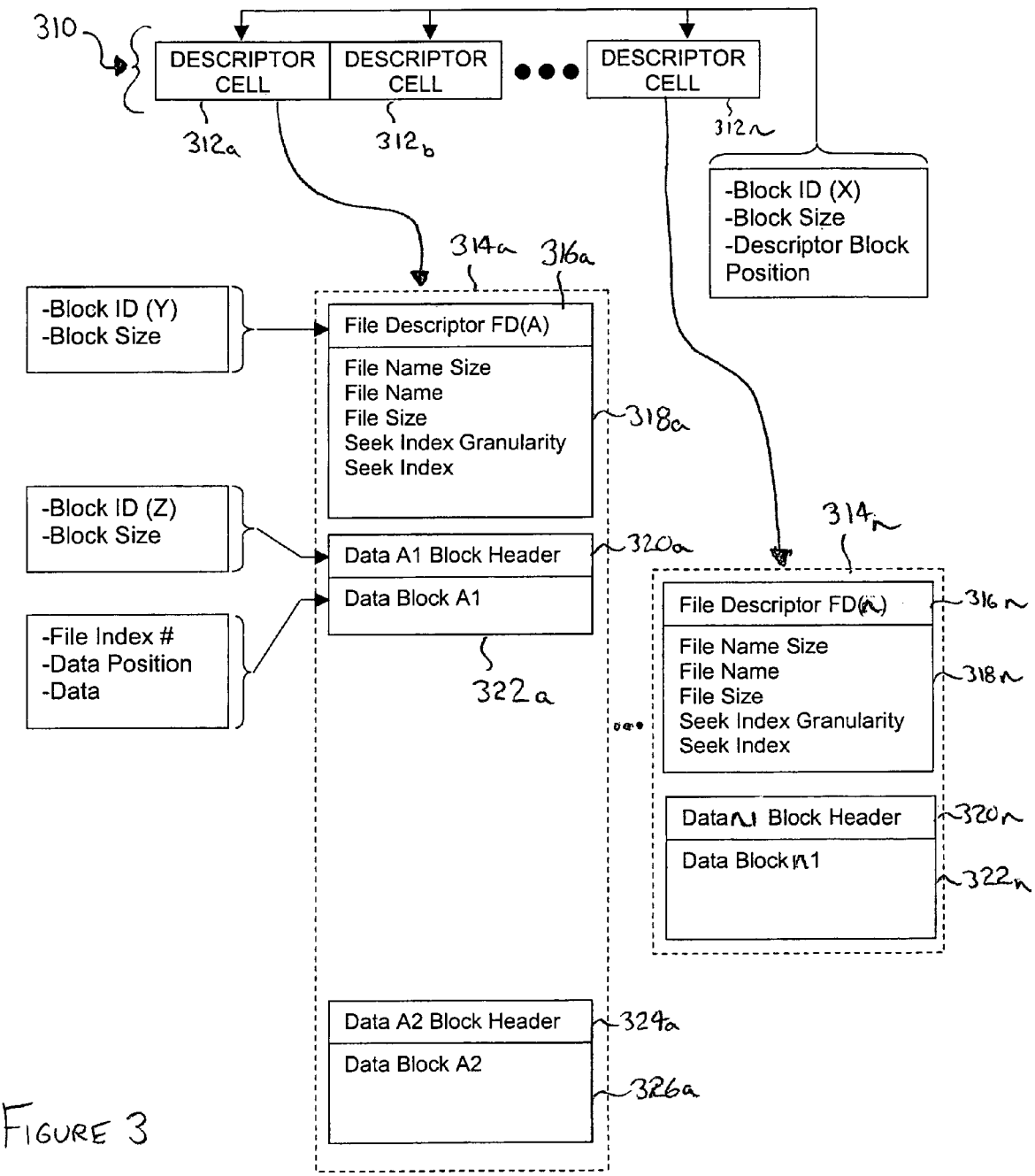
FIG. 3 illustrates an example container file format in accordance with one embodiment of the present invention.

FIG. 3 illustrates an example container file data structure in accordance with one embodiment of the present invention. Descriptor index 310 may represent an array of descriptor cell blocks 312(a-n), where each descriptor cell block contains data indicating a location where a corresponding virtual file may be found within the container file. In one embodiment, each descriptor cell block contains an identifier which identifies the cell as being part of the descriptor index, an identifier indicating the size of the corresponding descriptor cell block, and a pointer indicating a file descriptor block position for a corresponding virtual file. In one embodiment, one or more descriptor cell blocks may contain a uniform resource locator (URL) referencing the corresponding virtual file. In one embodiment, the last descriptor cell block in one descriptor index may point to the first descriptor cell block of another descriptor index in the event additional descriptor cell blocks, beyond that which a single descriptor index may address, are required.

As shown in FIG. 3, each virtual file 314(a-n) includes a file descriptor block including file descriptor block header 316(a-n) and file descriptor block data 318(a-n). As illustrated, file descriptor block header 316(a-n) may indicate the size of the descriptor block and may include a block identifier indicating that the data block represents a file descriptor block. Additionally, file descriptor block data 318(a-n) may indicate a file name, a file name size, a file size, a seek index, and a seek index granularity as shown. The file name and file name size refer to internal tags by which the corresponding virtual file may be identified by e.g. a descriptor cell block.

In one embodiment, the seek index represents equally distributed data blocks within a corresponding virtual file, and the seek index granularity indicates the size of each of the indexed data blocks in the virtual file. In one embodiment, if the size of the container file falls within a determined range of an indicated maximum buffer size, the seek index granularity is increased to allow a larger amount of data to be indexed. For example, a seek index of size 1000 having a granularity of 25,000 might allow indexing of up to approximately 25 MB of information. However, if the seek index is kept constant and the seek index granularity is increased to 50,000, approximately 50 MB of information can be indexed. In such a case where the seek index granularity is 50,000, the first seek index element might point to the first data block in a given virtual file, whereas the second seek index element might point to the 50,000$^{th}$ data block in the same virtual file. This can be contrasted to a seek index having a granularity of 25,000 where the second element in the index would point to the 25,000$^{th}$ data block.

Each virtual file may contain one or more file data blocks, where each file data block may include data block header 320(a-n) and data block data 322(a-n). As with the file descriptor block header, the data block header may also include an identifier indicating the type of block (a file data block in this case), and the data block size. Furthermore, data block data 322(a-n) may include a file index number to indicate the virtual file within which the data belongs, a data position indicator to indicate the position of the data block in terms of a virtual offset from the beginning of the associated virtual file, and the actual data. In one embodiment, the file index number represents an ordinal position of the corresponding virtual file within the descriptor index.

Figure 4A:
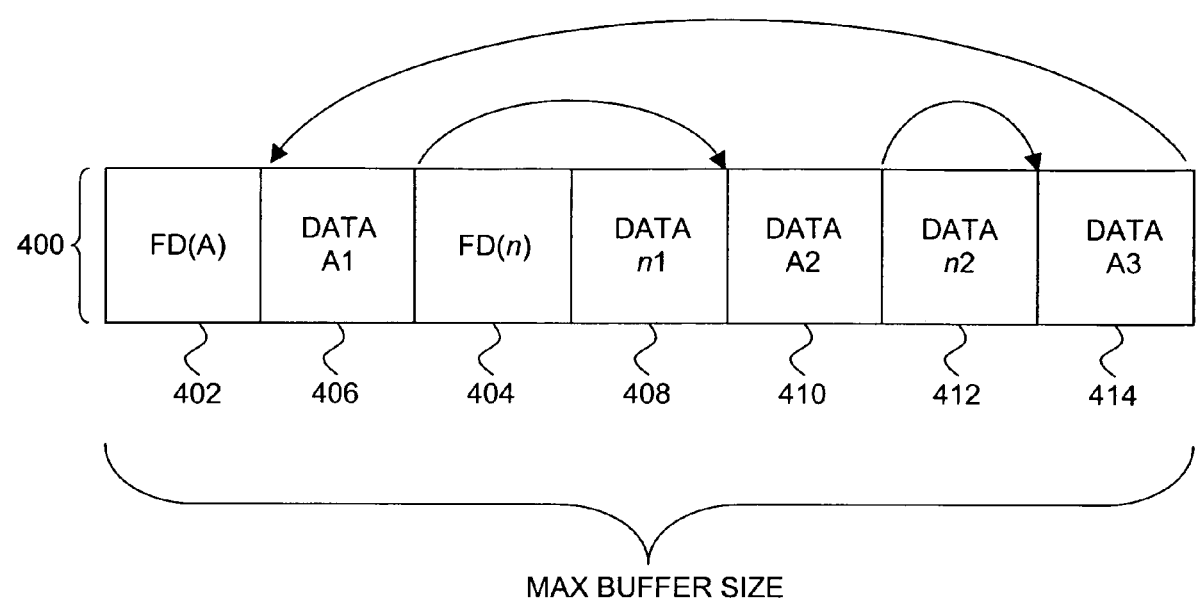
FIG. 4A graphically depicts an example container data structure used to illustrate looping within a container file in accordance with one embodiment of the present invention.

FIG. 4A illustrates an example of a serialized container file in accordance with one embodiment of the invention. As shown, container file 400 includes file descriptor blocks 402 and 404, as well as data blocks 406, 408, 410, 412 and 414. In accordance with one embodiment, as data is received by core logic 104, it is stored into one virtual file or another depending upon the presentation source with which the data originates or is otherwise associated. Every time a new virtual file is created, a new file descriptor for that virtual file (as shown by descriptor blocks 402 and 404) is added to the container. Similarly, every time data is received, it is stored as a data block within one virtual file or another based upon the presentation source with which the data is associated.

In accordance with one embodiment of the invention, data blocks are stored into container file 400 until the container file size falls within a predetermined range of an identified maximum buffer size. At such time, the next data block to be written in the virtual file may be stored in place of or written over at least a portion of existing data associated with the same presentation source. For example, after data block 414 associated with virtual file 'A' is stored, container file 400 may approach, reach, or exceed an identified maximum buffer size. Thereafter, the next data block associated with virtual file 'A' to be stored in container file 400 may be stored in place of data block 406 such that the data effectively loops within the current virtual file. In one embodiment, the next data block associated with virtual file 'A' to be stored in container file 400 may be stored in place of data block 410. This is because blocks 404 and 408 respectively represent a descriptor block and a data block associated with virtual file 'B'. In one embodiment, core logic 104 utilizes block sizes identified within the container file blocks to determine how much data should be skipped before the next sequential data block associated with the same virtual file can be found.

Figure 4B:
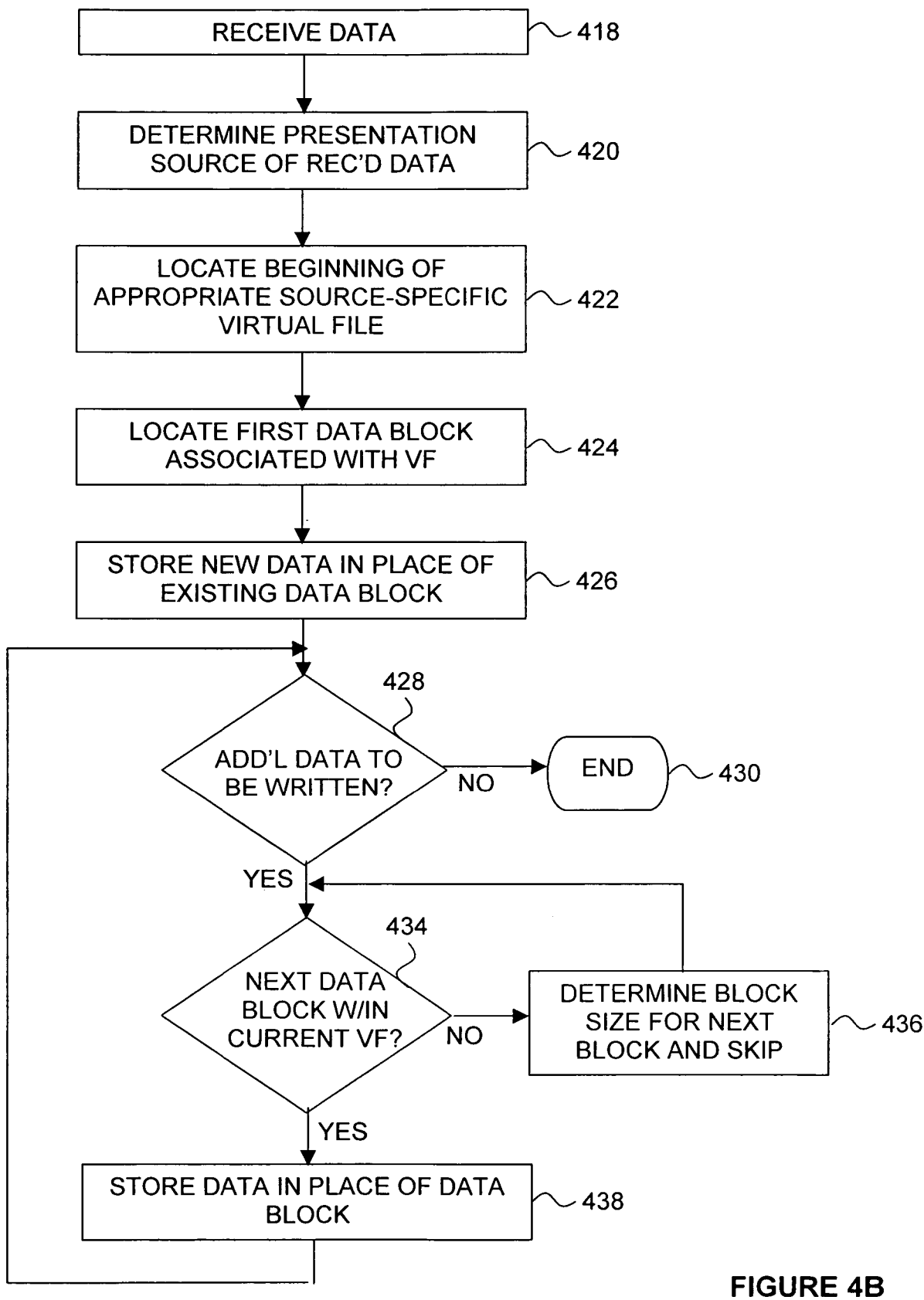
FIG. 4B illustrates an operational flow diagram for looping within a container file in accordance with one embodiment of the present invention.

FIG. 4B illustrates an operational flow diagram for looping within a container file in accordance with one embodiment of the present invention. As shown, the illustrated embodiment assumes that the container file size is equal to an identified maximum buffer size. As such, any additional data buffering will not cause the container file to increase in size.

In the illustrated embodiment, the process begins at block 418 where data to be buffered within the container file is received. Thereafter, the presentation source of received data is identified at block 420. In one embodiment, the presentation source and corresponding virtual file may be determined by examining headers of the received data. At block 422, the beginning of a source-specific virtual file corresponding to the identified presentation source is located. In one embodiment, the beginning of a particular virtual file may be located by searching for an ordinal corresponding to the virtual file within the descriptor index of the container file. At block 424, the first data block stored within the identified virtual file may be located (e.g., block 406 in FIG. 4A). In one embodiment, specific data blocks may be located within a virtual file by referencing one or more seek indices within the container file. At block 426, the newly received data may be stored in place of a located first data block.

At block 428 a determination is made as to whether additional data exists that is to be stored in the container file. If not, the process is complete as shown by block 430. However, if additional data to be stored in the container file exists, a further determination may be made at block 434 as to whether the next sequential block in the container file is a data block associated with the current virtual file at block 434. If not, the block size for the next sequential block is determined and that block is then skipped at block 436. The process then continues at block 434 where a further determination is made as to whether the next block in the container file is a data block within the current virtual file. If so, the data is stored in place of the data block (block 438). Thereafter, if additional data exists to be written at block 428 the looping process repeats with existing data blocks being overwritten by newly received data of a shard presentation source.

Figure 5:
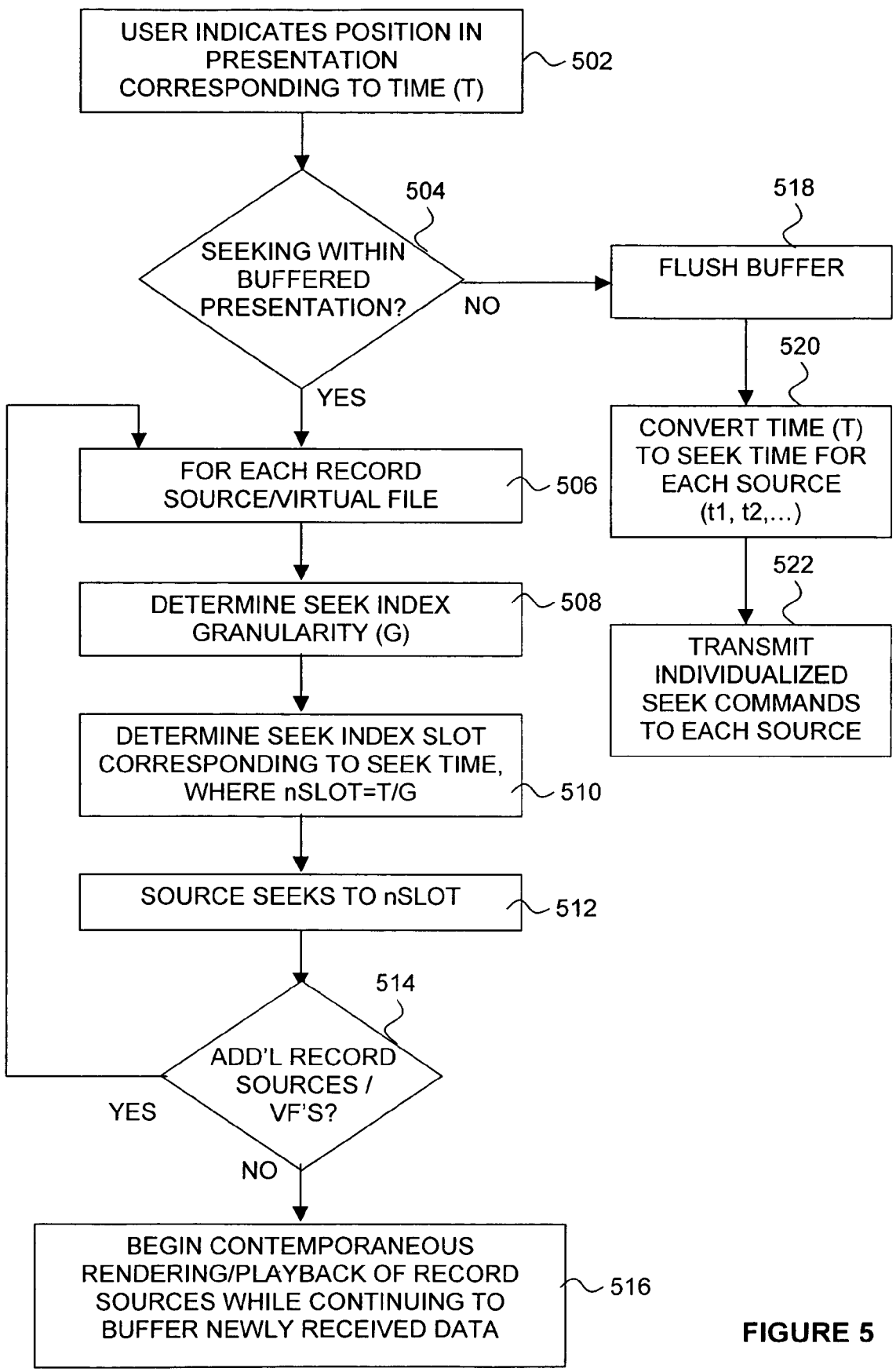
FIG. 5 is a flow diagram illustrating a seek operation for use within a container file in accordance with one embodiment of the present invention.

FIG. 5 is a flow diagram illustrating a seek operation for use within a container file in accordance with one embodiment of the present invention. As shown, the illustrated process begins at block 502 with a user indicating a position within a presentation corresponding to time (T). In one embodiment, a user may make such an indication via a graphical user interface presented to the user e.g. as part of a content/media player application.

At block 504 a determination is made as to whether the user is attempting to seek outside of the buffered portion of the presentation. If the user is attempting to seek outside of the buffered portion of the presentation, any existing data stored within the buffer is flushed at block 518, a seek time for each source is determined at block 520 and individualized seek commands are transmitted to each source at block 522.

However, if the user is attempting to seek within the buffered presentation, the following process may be carried out for each record source/virtual file that exists within the container file, block 506. More specifically, the seek index granularity associated with the current virtual file is determined at block 508. Further at block 510, a seek index slot corresponding to the indicated seek time is also determined, where nSlot=T/G. Thereafter at block 512, the current source seeks to nSlot within the virtual file and a determination is made as to whether additional record sources/virtual files exist at block 514. If so, a seek index granularity and nSlot value are determined for each successive record source/virtual file such that each successive record source may then seek to the appropriate location within the respective virtual file. However, if no additional record sources/virtual files exist, contemporaneous rendering/playback of each of the record sources may begin while newly received data continues to be buffered, block 516

Figure 6:
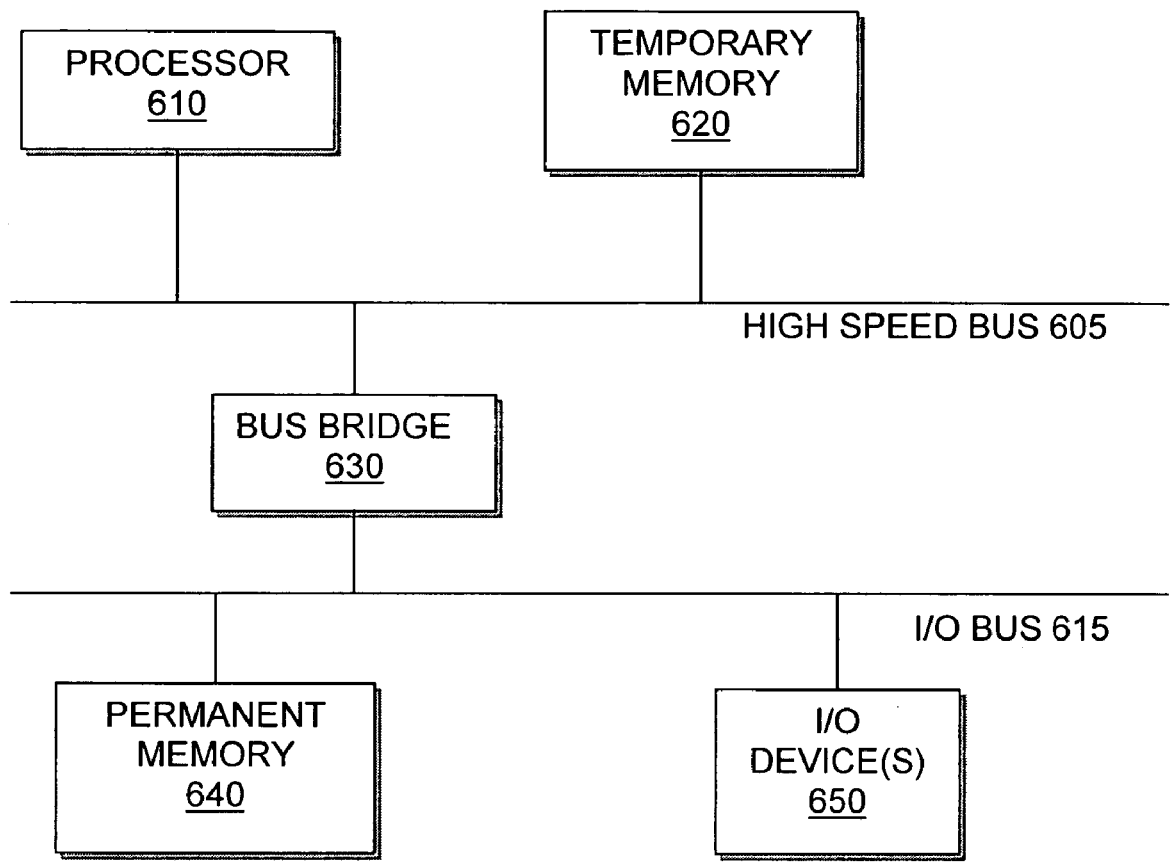
FIG. 6 illustrates one embodiment of a generic hardware system suitable for use as client device 100 incorporated with the teachings of the present invention.

FIG. 6 illustrates one embodiment of a generic hardware system suitable for use as client device 100 incorporated with the teachings of the present invention. In one embodiment, client device 100 may represent a broad range of digital systems known in the art, including but not limited to devices such as wireless mobile phones, palm sized personal digital assistants, notebook computers, desktop computers, set-top boxes, and game consoles. In the illustrated embodiment, the hardware system includes processor 610 coupled to high speed bus 605, which is coupled to input/output (I/O) bus 615 through bus bridge 630. Temporary memory 620 is coupled to bus 605, while permanent memory 640 and I/O device(s) 650 are coupled to bus 615. I/O device(s) 650 may include a display device, a keyboard, one or more external network interfaces, etc.

Certain embodiments may include additional components, may not require all of the above components, or may combine one or more components. For instance, temporary memory 620 may be on-chip with processor 610. Alternately, permanent memory 640 may be eliminated and temporary memory 620 may be replaced with an electrically erasable programmable read only memory (EEPROM), wherein software routines are executed in place from the EEPROM. Some implementations may employ a single bus, to which all of the components are coupled, or one or more additional buses and bus bridges to which various additional components can be coupled. Similarly, a variety of alternate internal networks could be used including, for instance, an internal network based on a high speed system bus with a memory controller hub and an I/O controller hub. Additional components may include additional processors, a CD ROM drive, additional memories, and other peripheral components known in the art.

In one embodiment, the hardware system of FIG. 6 operating as client device 100 may be coupled to a local area network (LAN), an internet protocol (IP) network, etc. For example, client device 100 may be communicatively coupled to a rights issuer and/or content provider via a shared network. In one embodiment, the present invention as described above may be implemented as software routines executed by one or more execution units within a computing device. For a given computing device, the software routines can be stored on a storage device, such as permanent memory 640.

Figure 7:
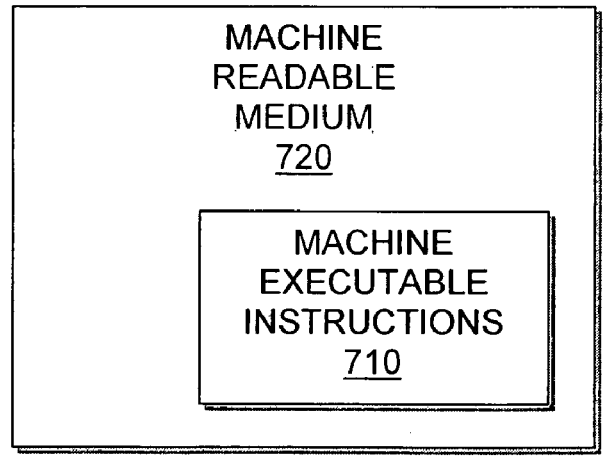
FIG. 7 illustrates one embodiment of a machine-readable medium to store executable instructions for embodiments of the present invention.

Alternately, as shown in FIG. 7, the software routines can be machine executable instructions 710 stored using any machine readable storage medium 720, such as a diskette, CD-ROM, magnetic tape, digital video or versatile disk (DVD), laser disk, ROM, Flash memory, etc. The series of instructions need not be stored locally, and could be received from a remote storage device, such as a server on a network, a CD ROM device, a floppy disk, etc., through, for instance, I/O device(s) 650 of FIG. 6.

From whatever source, the instructions may be copied from the storage device into temporary memory 620 and then accessed and executed by processor 610. In one implementation, these software routines may be written in the C programming language. It is to be appreciated, however, that these routines may be implemented in any of a wide variety of programming languages.

In alternate embodiments, the present invention as described above may be implemented in discrete hardware or firmware. For example, one or more application specific integrated circuits (ASICs) could be programmed with one or more of the above-described functions of the present invention. In another example, one or more functions of the present invention could be implemented in one or more ASICs on additional circuit boards and the circuit boards could be inserted into the computer(s) described above. In another example, field programmable gate arrays (FPGAs) or static programmable gate arrays (SPGA) could be used to implement one or more functions of the present invention. In yet another example, a combination of hardware and software could be used to implement one or more functions of the present invention.

EPILOG

While the present invention has been described in terms of the above-illustrated embodiments, those skilled in the art will recognize that the invention is not limited to the embodiments described. The present invention can be practiced with modification and alteration within the spirit and scope of the appended claims. Thus, the description is to be regarded as illustrative instead of restrictive on the present invention.

What is claimed is:

1. A method of storing streamed presentation data within a container file, the method executing on a consumer digital content playback device, the method comprising:
   receiving one or more data streams from each of one or more presentation sources within the presentation;
   creating within the container file, a virtual file for each of the one or more presentation sources;
   temporarily storing first data associated with a first data stream of a first presentation source in association with a first virtual file corresponding to the presentation source;
   determining a container file size of the container file;
   temporarily storing additional data from the first data stream in place of at least a portion of the first data if the container file size is within a predetermined range of an identified maximum buffer size;
   receiving a user indication identifying a location corresponding to a time (T) within the presentation;
   identifying a seek position for each virtual file; and
   contemporaneously rendering in real-time, data stored in each virtual file at the respective seek positions.

2. The method of claim 1, wherein the additional data from the first data stream is stored in place of at least a portion of the first data if the container file size is equal to or exceeds the identified maximum buffer size.

3. The method of claim 1, further comprising: temporarily storing second data associated with a second data stream of the first presentation source in association with the first virtual file; and temporarily storing additional data from the second data stream in place of at least a portion of the second data stored in association with the first virtual file if the container file size is within the predetermined range of the identified maximum buffer size.

4. The method of claim 3, further comprising: rendering one of the first and second data streams in real-time contemporaneous with the storing of at least one of the first and second data streams.

5. The method of claim 3, further comprising: temporarily storing data associated with a third data stream of a second presentation source in association with a second virtual file; and temporarily storing additional data from the third data stream in place of at least a portion of the data stored in association with the second virtual file if the container file size is within the predetermined range of the identified maximum buffer size.

6. The method of claim 1, wherein the maximum buffer size is proportional to an amount of time indicated via a user interface.

7. The method of claim 1, wherein the maximum buffer size is dynamically increased during the storing of data from the first data stream.

8. The method of claim 1, wherein the first data and additional data are stored in a native packet format prior to a decoding process.

9. The method of claim 1, wherein each virtual file comprises: at least a first data block; and a file descriptor block containing at least a seek index and a seek index granularity, wherein the seek index indicates a plurality of equally distributed data blocks within the corresponding virtual file and the granularity indicates a size for each of the data blocks.

10. The method of claim 9, wherein the additional data is stored in place of the first data beginning with the first data block and continuing with successive data blocks of the first virtual file.

11. The method of claim 9, wherein if the container file size is within the predetermined range of the identified maximum buffer size, the seek index granularity is increased so as to increase data block size without changing the number of seek index entries.

12. The method of claim 9, wherein each seek position is determined by dividing time (T) by the seek granularity for the corresponding virtual file.

13. A machine readable storage medium having machine executable instructions, which when executed on a consumer digital content playback device operate to implement a method comprising:
receiving one or more data streams from each of one or more presentation sources within a presentation;
creating within a container file, a virtual file for each of the one or more presentation sources;
temporarily storing first data associated with a first data stream of a first presentation source in association with a first virtual file corresponding to the presentation source;
determining a container file size of the container file;
temporarily storing additional data from the first data stream in place of at least a portion of the first data if the container file size is within a predetermined range of an identified maximum buffer size;
receiving a user indication identifying a location corresponding to a time (T) within the presentation;
identifying a seek position for each virtual file; and
contemporaneously rendering in real-time, data stored in each virtual file at the respective seek positions.

14. The machine readable medium of claim 13, wherein the additional data from the first data stream is stored in place of at least a portion of the first data if the container file size is equal to or exceeds the identified maximum buffer size.

15. The machine readable medium of claim 13, further comprising instructions to temporarily store second data associated with a second data stream of the first presentation source in association with the first virtual file; and temporarily store additional data from the second data stream in place of at least a portion of the second data stored in association with the first virtual file if the container file size is within the predetermined range of the identified maximum buffer size.

16. The machine readable medium of claim 15, further comprising instructions to render one of the first and second data streams in real-time contemporaneous with the storing of at least one of the first and second data streams.

17. The machine readable medium of claim 15, further comprising instructions to: temporarily store data associated with a third data stream of a second presentation source in association with a second virtual file; and temporarily store additional data from the third data stream in place of at least a portion of the data stored in association with the second virtual file if the container file size is within the predetermined range of the identified maximum buffer size.

18. The machine readable medium of claim 13, wherein the maximum buffer size is proportional to an amount of time indicated via a user interface.

19. The machine readable medium of claim 13, wherein the maximum buffer size is dynamically increased during the storing of data from the first data stream.

20. The machine readable medium of claim 13, wherein the first data and additional data are stored in a native packet format prior to a decoding process.

21. The machine readable medium of claim 13, wherein each virtual file comprises: at least a first data block; and a file descriptor block containing at least a seek index and a seek index granularity, wherein the seek index indicates a plurality of equally distributed data blocks within the corresponding virtual file and the granularity indicates a size for each of the data blocks.

22. The machine readable medium of claim 21, wherein the additional data is stored in place of the first data beginning with the first data block and continuing with successive data blocks of the first virtual file.

23. The machine readable medium of claim 21, wherein if the container file size is within the predetermined range of the identified maximum buffer size, the seek index granularity is increased so as to increase data block size without changing the number of seek index entries.

24. The machine readable medium of claim 21, wherein each seek position is determined by dividing time (T) by the seek granularity for the corresponding virtual file.

* * * * *